Sept. 17, 1968 M. H. OGER 3,401,975
FLOOR COVERING FOR AUTOMOBILES
Filed June 28, 1966 2 Sheets-Sheet 1

INVENTOR.
Martin H. Oger
BY
Parker Brockman
ATTORNEYS.

Sept. 17, 1968    M. H. OGER    3,401,975
FLOOR COVERING FOR AUTOMOBILES
Filed June 28, 1966    2 Sheets-Sheet 2
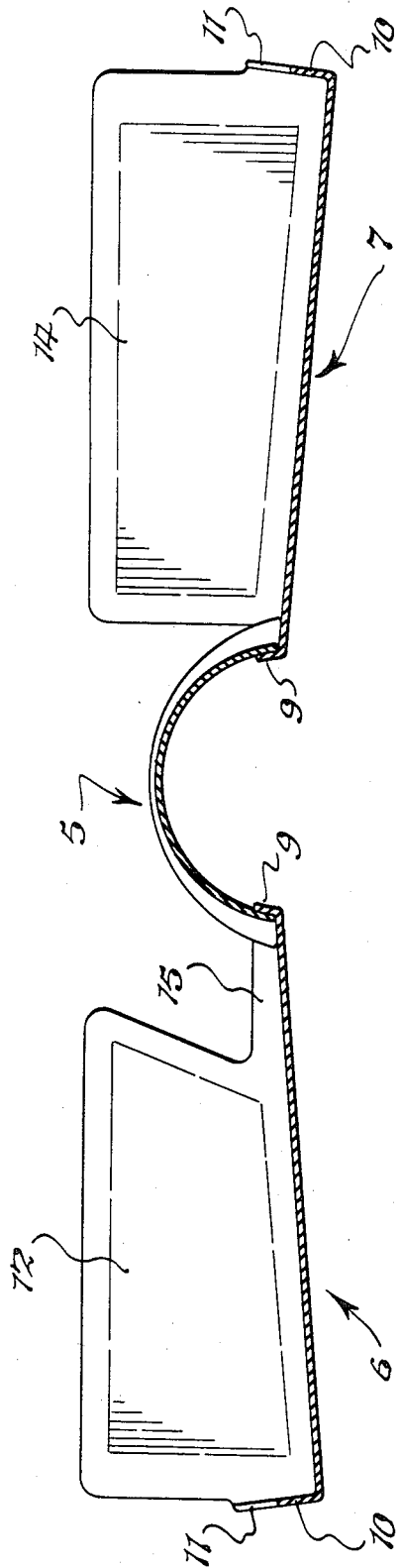
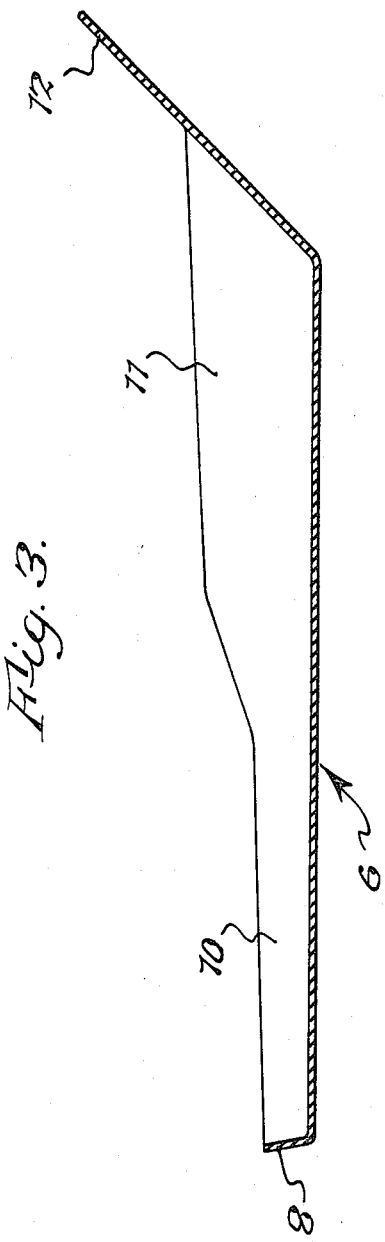
INVENTOR.
Martin H. Oger
BY
Parker & Prochnow
ATTORNEYS.

ated Sept. 17, 1968

3,401,975
FLOOR COVERING FOR AUTOMOBILES
Martin H. Oger, 131 Leroy Ave.,
Buffalo, N.Y. 14214
Filed June 28, 1966, Ser. No. 561,136
1 Claim. (Cl. 296—1)

ABSTRACT OF THE DISCLOSURE

The disclosure shows flexible floor covering for automobiles constructed so as to retain water and other foreign materials in the side parts of the floor covering, which are constructed to retain the water so that it can be removed when the side parts are removed from the automobile.

This invention relates to improvements in waterproof floor covering for automobiles, particularly for the floors in front of the front seats of automobiles.

In most automobiles there is a sill below each front door which prevents water from draining from the floor space so that eventually the original floor covering or carpet becomes soggy and objectionable.

It is consequently an object of this invention to provide a waterproof floor covering to be placed upon the floor of an automobile to contain the water and other foreign material and prevent wetting the carpet or other material which is arranged on the floor.

It is also an object to provide an improved floor covering which is constructed so that it can be easily lifted from the floor and dumped after being removed from the automobile and again easily be positioned on the floor.

It is also an object of this invention to provide a waterproof floor covering which is built in sections so that the individual sections can be readily lifted and removed from the vehicle to dump water collected therein and in which the floor covering has a middle portion which covers the usual central, longitudinally extending hump in such a manner that any water on the middle portion will be drained to the covering parts of either side of the hump.

In the accompanying drawings:

FIG. 2 is a transverse sectional view thereof on line 2—2, FIG. 1.

FIG. 3 is a longitudinal, sectional view thereof on line 3—3, FIG. 1.

Figure 1:
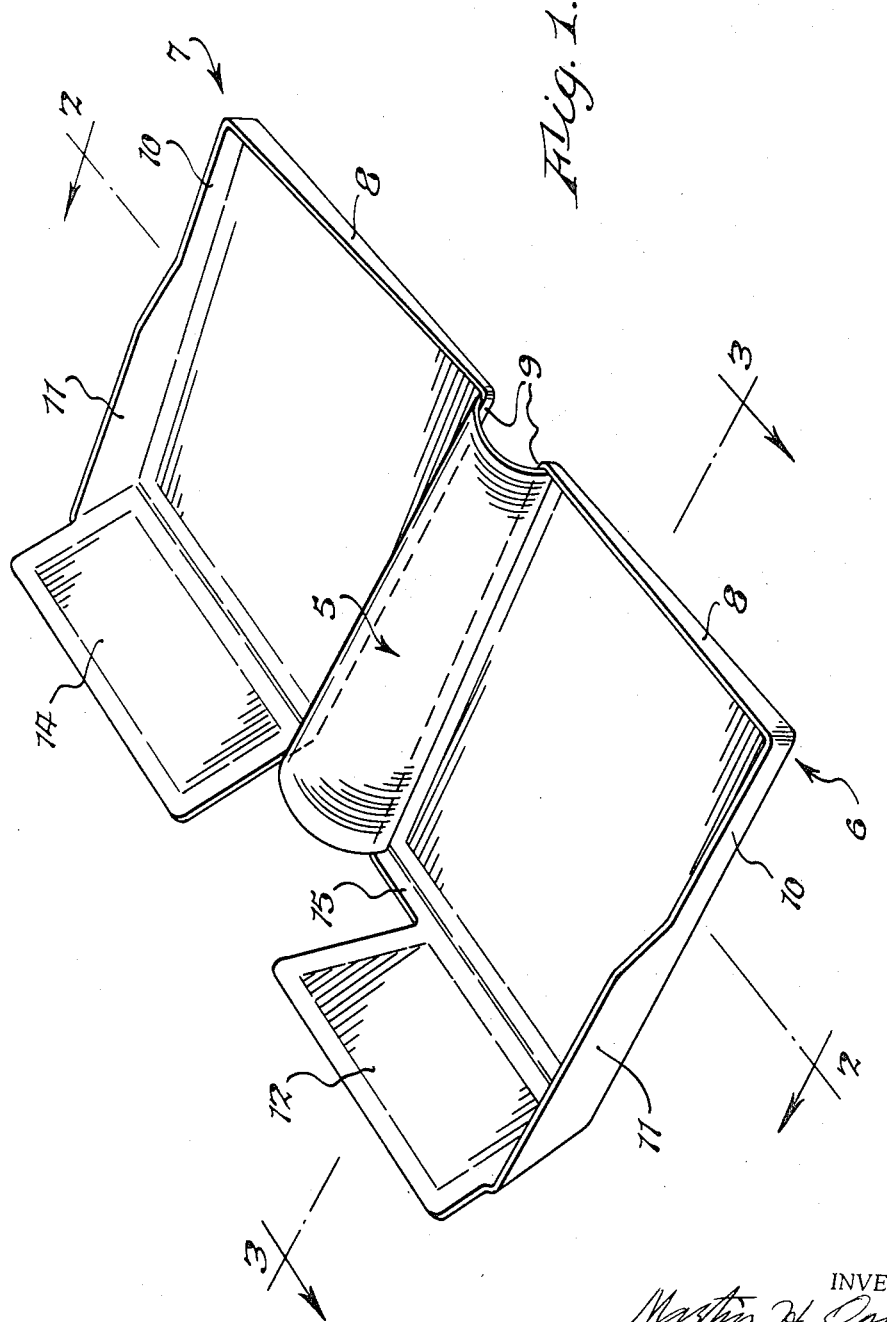
FIG. 1 is a perspective view of a floor covering embodying this invention and showing the parts of the same arranged in positions to collect water so as to protect the floor of the automobile.

The floor covering according to my invention is made of any suitable waterproof and flexible material, such for example, as natural or synthetic rubber and various kinds of plastic materials.

My improved covering is made in three parts, a middle part 5 which extends over the usual central longitudinal hump of the automobile, and two side parts 6 and 7 formed to lie on substantially flat parts of the floor at opposite sides of the hump. The two side parts 6 and 7 have upwardly extending borders or walls at the edges thereof which serve as dams to retain water within said side parts. The rear and the side edges of these side parts have upwardly extending edge walls 8 and 9. Since the automobile floors at opposite sides of the tunnel or hump generally slope toward opposite sides of the automobile, the rear edge walls 8 preferably increase gradually in height toward the outer sides of the parts 6 and 7. At the outer sides of the side parts 6 and 7 the edge walls each have a portion 10 of less height than the parts 11 extending forwardly therefrom. By means of this arrangement the users of the car entering or leaving the same do not have a high edge wall to step over and the higher edge wall 11 is better able to retain water collecting to a greater depth in the lower forward portions of the side parts 6 and 7 which generally slope downwardly toward the front of the car in accordance with the floor of the car.

At the front edges of the side parts 6 and 7 of the floor covering, higher borders or walls 12 and 14 are provided which slope forwardly and upwardly to lie on the foot rests of the car. Much of the water collecting on the floor of the car is brought in on the shoes of the users, so that these higher borders 12 and 14 drain this water into the side parts 6 and 7. The wide, upwardly sloping part 12 of the side part 6 stops at a short distance from the inner border 9 and a border 15 of much less height is provided which is integrally connected with the sloping part 12 and the edge wall 9 of the side parts 6. By means of this arrangement the space above the border 15 is left free for the usual pedal or pedals of the car. On the right side of the car no pedals exist so that the inclined part 14 is integrally connected directly with the edge wall of the part 7.

The middle part 5 of my improved floor covering is entirely detached from the two side members 6 and 7 and is so formed that the longitudinal edges of the middle part 5 will overlap the edge walls 9 so that any water collecting on the middle part 5 will drain down over the edge walls 9 into either of the two side parts 6 or 7 of my floor covering. This arrangement has the advantage that either of the side parts 6 or 7 can be removed from the middle part 5 so as to be easily taken out of the car for draining and again replaced. Consequently the middle part 5 need not be taken out of the car, and either side part 6 or 7 may be removed or replaced independently of the other, thus reducing the amount of effort required to remove water from the car floor without reducing the thoroughness of the removal. Furthermore, by making the middle part 5 independent of the two side parts 6 and 7, my floor covering can be adapted to many different automobiles which may differ somewhat in the length and width of the central hump or tunnel to be covered by the middle part 5.

It will be understood that various changes in the details, materials and arrangements of parts which have been herein described and illustrated in order to explain the nature of the invention may be made by those skilled in the art within the principle and scope of the invention as expressed in the appended claim.

I claim:
1. A floor covering of waterproof flexible material for an automobile having a longitudinally extending central hump, said covering being made of three separate parts, two of said parts formed to lie on substantially flat floor portions at opposite sides of the hump and a middle part positioned between said first two parts and extending over said hump,
   said two side parts having upwardly extending borders around all edges thereof for retaining moisture on said two parts,
   said borders being of greater height at the outer and front edges of said side parts to collect water at the front portions of said side parts,
   said middle part being detached from said other parts and having its longitudinal edges overlapping the adjacent borders of said first two parts so that water on said middle part will drain onto said first two parts, whereby either of said first two parts may be removed from the automobile for emptying water and foreign material therefrom independently of the other parts, said front borders of said two parts having upwardly and forwardly inclined extensions arranged to lie on the foot boards and to drain water collecting thereon into said two parts.

References Cited

UNITED STATES PATENTS

| 3,337,258 | 8/1967 | Steinberg | 296—1 |
| 3,050,329 | 8/1962 | Pagan | 296—1 |

PHILIP GOODMAN, *Primary Examiner.*